United States Patent [19]

Patel

[11] Patent Number: 5,063,836
[45] Date of Patent: Nov. 12, 1991

[54] COFFEE MAKING MACHINE AND COMPONENTS THEREOF

[75] Inventor: Dahyabhai U. Patel, Vancouver, Canada

[73] Assignee: Cafe 98 Industries Ltd., Vancouver, Canada

[21] Appl. No.: 301,116

[22] Filed: Jan. 25, 1989

[51] Int. Cl.$^5$ .............................................. A47J 31/00
[52] U.S. Cl. ........................................ 99/281; 19/282; 19/285; 19/299; 19/307
[58] Field of Search ................. 99/279, 280, 281, 282, 99/283, 285, 295, 300, 302 R, 304, 305, 307, 299; 426/433; 219/308, 297

[56] References Cited

U.S. PATENT DOCUMENTS

| | | | |
|---|---|---|---|
| 3,336,856 | 8/1967 | Martin | 99/300 |
| 3,379,117 | 4/1968 | Richeson | 99/283 |
| 3,641,918 | 2/1972 | Schellgell | 99/300 |
| 3,771,432 | 11/1973 | Karlen | 99/307 |
| 4,503,757 | 3/1985 | Daugherty | 219/297 |
| 4,572,060 | 2/1986 | Yung-Kuan | 99/280 |
| 4,641,011 | 2/1987 | Roberts | 219/308 |
| 4,793,513 | 12/1988 | Verheijen | 222/14 |
| 4,829,888 | 5/1989 | Webster et al. | |

FOREIGN PATENT DOCUMENTS

| | | |
|---|---|---|
| 8401201 | 11/1985 | Denmark . |
| 204411 | 12/1986 | European Pat. Off. . |
| 244010 | 11/1987 | European Pat. Off. . |
| 1454231 | 2/1969 | Fed. Rep. of Germany . |
| 3516727 | 11/1986 | Fed. Rep. of Germany . |
| 456179 | 7/1968 | Switzerland . |

*Primary Examiner*—Robert W. Jenkins
*Attorney, Agent, or Firm*—Nixon & Vanderhye

[57] ABSTRACT

A coffee making machine of the type adapted to be connected to a mains water supply is provided with a reservoir having a level sensor controlling the water refill valve to the reservoir, and a heating element which is thermostatically controlled, the refill valve and the thermostat both being controlled by a single modular replaceable solid state circuit board. The level sensor functions to cause refill of the reservoir to the appropriate level for subsequent brewing of a full pot of coffee, irrespective of the mains water pressure and the route by which water may previously have been removed from the reservoir. The electronically controlled thermostat allows only small drops in temperature, e.g. 3° F., before operating to reheat the water in the reservoir. The water can accordingly be stored at closer to the boiling point and delivered to contact coffee for brewing purposes at temperatures of not less than 200° F.

14 Claims, 4 Drawing Sheets

COFFEE MAKING MACHINE AND COMPONENTS THEREOF

This invention relates to coffee making machines, of the type adapted to be connected to a mains water supply and arranged to deliver hot water as required to ground coffee contained in a filter, to brew pots of coffee as required. The invention also relates to interchangeable and replaceable components for use in coffee making machines of this and other types.

Conventional coffee making machines such as commonly used in offices and restaurants are provided with a water reservoir, a heating element in the reservoir and various heat and flow controls so that an appropriate quantity of hot water is available for coffee brewing purposes. The ground coffee is contained in a removable filter unit disposed below the outlet from the hot water reservoir. When an operator wishes to brew a pot of coffee, the operator switches the controls so that hot water from the reservoir exits through the ground coffee and the filter into a storage pot located on a warming plate below the filter. The reservoir is eventually refilled with water and reheated, ready for brewing a fresh pot of coffee. Many such coffee making machines are also equipped with a second outlet faucet, whereby hot water can be withdrawn from the reservoir without passing through the coffee filter, e.g. for making tea, hot chocolate or other beverages.

There are several disadvantages associated with such coffee making machines currently in commercial use. It is common to provide a reservoir of known volume substantially greater than that of the coffee pot, e.g. three times greater, so that an appropriate amount of hot water can be delivered automatically through the ground coffee to make a full pot of coffee whilst leaving in the reservoir a substantial amount of hot water. The refilling of the reservoir is normally controlled by a timer mechanism which opens a water inlet valve to the reservoir for a pre-set period of time prearranged to refill the reservoir. Such a conventional arrangement often leads to insufficient refilling of the reservoir. For example, a timer mechanism cannot take account of fluctuations in mains water pressure. Particularly where the coffee making machine is used on the upper floors of high buildings the pressure of the water supply to the machine is apt to be lower than anticipated by the machine manufacturer, and subject to greater fluctuations. Moreover, the withdrawal of hot water via the second outlet faucet, in small, cup-size quantities, is not compensated by the timer mechanism. Both these factors commonly lead to the brewing of a short pot of overly strong coffee on next operation.

Moreover, coffee making machines currently on the market tend to be deficient in their temperature control of the water in the reservoir. It is desirable to contact the ground coffee with water at temperatures between 195° F. and 205° F. The thermostat in the reservoir must of course be set lower than this to allow a margin of safety against boiling over. Since they employ mechanical thermostats, these conventional machines react slowly to cooling of the water in the reservoir, and must often tolerate a decline of 10°-12° F. before reheating. Some heat is lost in delivery of the water from the reservoir to the ground coffee (a temperature drop of about 10° F. in most cases). As a result, conventional machines deliver water to the ground coffee at a temperature of about 180°-185° F.

It is therefore an object of the present invention to provide a novel coffee making machine of the above type which overcomes or at least reduces one or more of the foregoing disadvantages.

In the present invention, the reservoir of the coffee making machine is provided with a level sensor controlling the water inlet flow valve to the reservoir, and a heating element which is thermostatically controlled electronically, the inlet flow valve and the thermostat both being controlled by a single, modular, replaceable, solid state circuit board. The level sensor functions to cause refill of the reservoir to the appropriate level for subsequent brewing of a full pot of coffee. The electronically controlled thermostat allows only small drops in temperature, e.g. 3° F., before operating to reheat the water in the reservoir. The water can accordingly be stored at closer to the boiling point, e.g. 210° F., and delivered to contact the ground coffee at temperatures of not less than 200° F. This markedly improves the flavour and overall quality of the coffee produced by the machine.

The provision of a level sensor electronically controlling the water inlet valve ensures that the level is maintained to provide a subsequent full pot of coffee of pre-set strength. It is independent of the main water pressure. It allows for withdrawal of water via the second outlet faucet. It also compensates for losses of water by gradual evaporation of hot water from the reservoir when the machine is left to stand for substantial periods, e.g. over an office weekend.

Thus according to the present invention, there is provided a coffee making machine of the type adapted to be connected to a mains water supply and to deliver hot water during a brewing cycle to ground coffee supported in a removal filter element, said coffee machine comprising:

a reservoir for water heating and storage;

valved inlet means adapted to connect the reservoir to mains water supply;

outlet means operable to deliver hot water from the reservoir to contact ground coffee;

an electrical heating element operable to heat the contents of the reservoir;

lower level sensing means adapted to sense a pre-determined water level condition in the reservoir;

temperature sensing means for monitoring the temperature of the reservoir contents; and control means in communication with said temperature sensing means and operable to enable said heating element in response to signals received from the temperature sensing means to maintain the reservoir contents within a pre-determined temperature and also adapted to control the valved inlet means for water supply to the reservoir in response to signals received from said lower level sensing means when said water is below said pre-determined condition.

Preferably therefore the control means is in the form of a solid state electronic control board which controls three functions in the machine. Firstly, in response to operation of a manually controlled brew cycle switch, it serves to open the outlet faucet to allow hot water from the reservoir to impinge upon coffee in the filter, to brew a pot of coffee. Secondly, in response to signals received from the lower level sensor, it causes refilling of the reservoir with cold water from the mains water supply to the pre-set level condition, and the maintenance of that level. Thirdly, it heats and maintains water in the reservoir at a pre-set temperature close to the boiling point. The inlets and outlets of the reservoir are arranged so that only hot water exits to the ground coffee or through the second outlet faucet. Suitably, the cold water is arranged to enter through a center sleeve arrangement to contact the heating element near the bottom of the reservoir, the outlets being disposed peripherally outwardly from the center sleeve and towards the upper part of the reservoir, so that water contacts and is heated by the heating element before reaching the locality of the outlets.

A preferred embodiment of the coffee making machine according to the present invention also includes an upper level sensor, disposed on the reservoir a short distance above the lower level sensor. The upper level sensor is adapted to close the inlet valve in response to levels of water sensed in the reservoir above the lower level sensor, via the electronic circuit control board, in the event that the lower level sensor malfunctions, so as to prevent overflow.

Preferably also, the upper and lower level sensors are electrically conductive elements which come into contact with water in the reservoir at an appropriate level. The sensors when contacted with the liquid isolate components in the board from a power source which in turn causes closing of the inlet valve. The upper sensor is suitably disposed about 1–1½ inches above the lower sensor, and is only brought into operation to close the inlet valve in the event that the lower sensor fails to perform.

It may be found desirable to include a visible warning arrangement on the coffee making machine to indicate when the lower level sensor is not working. This can be arranged through the circuit control board, to operate when the lower level sensor fails to work correctly to complete or break an electrical circuit when the water level in the reservoir rises to contact it, or to operate when the upper level sensor is brought into action to close the inlet valve because the lower level sensor has malfunctioned. Then the operator is warned to effect the necessary repairs before a risk of flooding due to malfunction of both sensors is encountered. Malfunctioning of the sensors is most likely to occur as a result of lime deposits thereon, when the coffee making machine is supplied with hard water.

In a further alternative embodiment, the present invention provides a brewing head adapted for use in conjunction with a coffee making machine, the brewing head including:

a reservoir for water heating and storage;

valved inlet means adapted to connect the reservoir to mains water supply;

outlet means operable to deliver hot water from the reservoir to contact ground coffee;

an electrical heating element operable to heat the contents of the reservoir;

lower level sensing means adapted to sense a predetermined water level condition in the reservoir;

temperature sensing means for monitoring the temperature of the reservoir contents; and control means in communication with said temperature sensing means and operable to enable said heating element in response to signals received from the temperature sensing means to maintain the reservoir contents within a pre-determined temperature and also adapted to control the valved inlet means for water supply to the reservoir in response to signals received from said lower level sensing means when said water is below said pre-determined condition.

Such a brewing head can be fitted into a variety of different coffee making machines with different frame and base configurations, adapted to accommodate a variety of different shapes and sizes of coffee pots.

A specific preferred embodiment of the present invention is illustrated in the accompanying drawings, in which.

Figure 1:
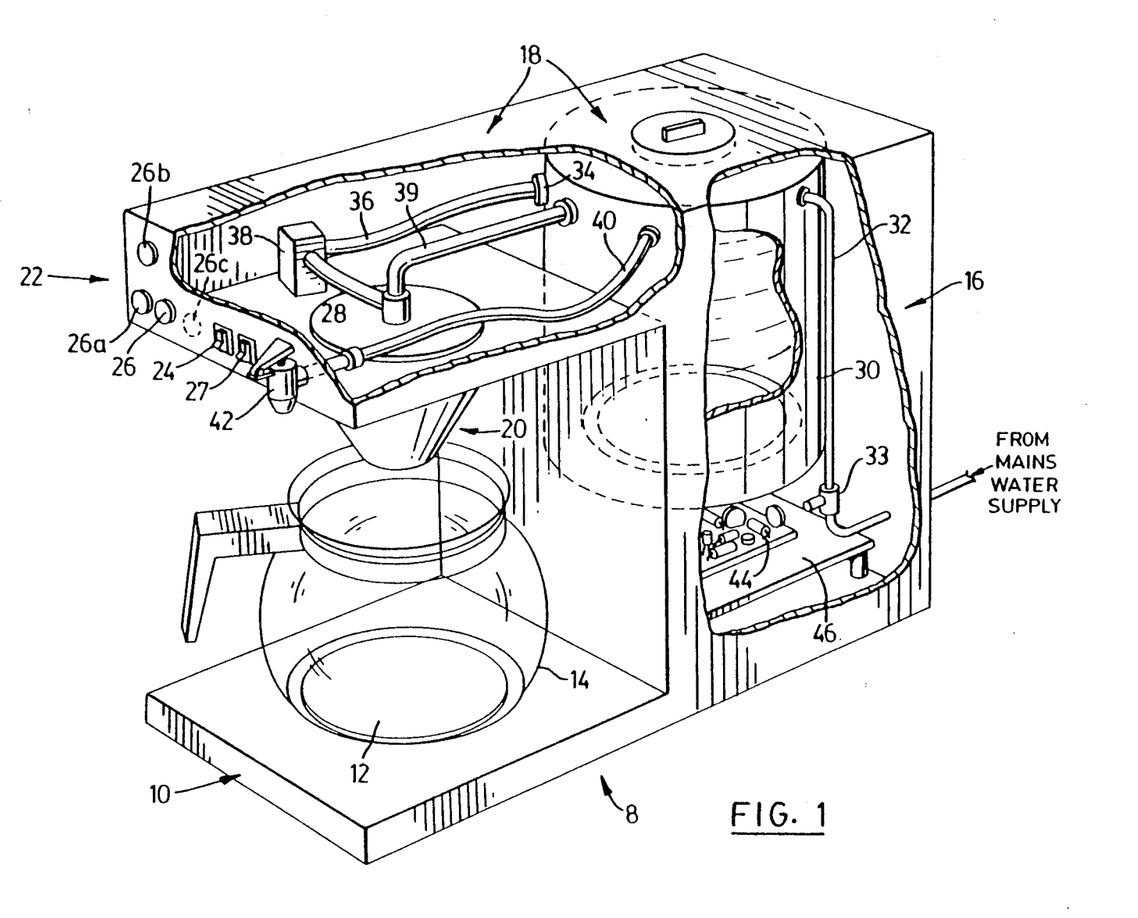
FIG. 1 is a perspective view of the coffee making machine with parts cut away.
Figure 2:
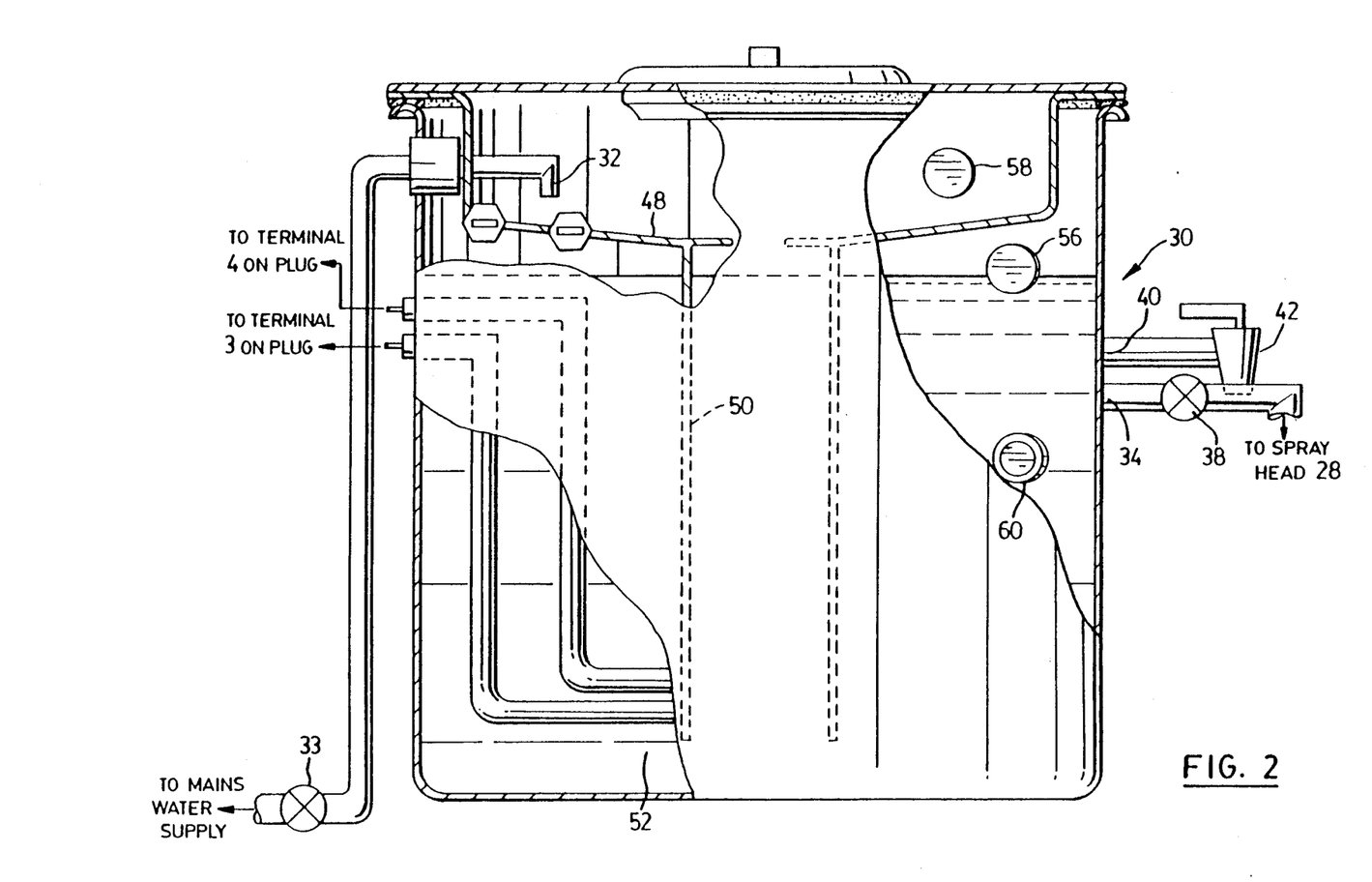
FIG. 2 is a diagrammatic partial sectional view of the water reservoir and associated parts of the machine of FIG. 1.

With reference to FIGS. 1 and 2, a coffee making machine according to this embodiment of the invention has a base 10 provided with a warming plate 12 on which a coffee pot 14 can rest. It has a column 16 in which most of the operating parts are mounted. It has a head 18 overlying the base 10 and removably supporting a filter basket 20 in which ground coffee is contained. The front panel 22 of the head 18 has an operating switch 24 for manual actuation of a brewing cycle, an on-off indicator light 26 and an on-off switch 27. A temperature indicator light 26a and a lower level sensor failure light 26b may also be provided on the panel 22. A hot water outlet in the form of a spray head 28 protrudes downwardly from head 18 into the vicinity of the filter basket 20.

The column 16 holds a water reservoir 30 to which cold water is fed via inlet 32. A solenoid operated valve 33 opens or closes inlet 32. The reservoir has a first outlet 34 connected by conduit 36 to the spray head 28 and controlled by solenoid actuated on-off valve 38. The reservoir has a second outlet 40 with a manually operated faucet 42, projecting forwardly from column 16. A pour-over feature outlet and conduit assembly 39 is also provided and extends from the reservoir 30 to the sprayhead 28. Also mounted in the column 16 is a solid state electronic circuit board 44 supported on and electrically plugged into a base plate 46. Appropriate electrical connections are made from the control and valve elements to the base plate 46, and hence to the control board 44 as described above. The control board 44 can be manually unplugged from the base plate 46 readily and simply, for replacement purposes.

The reservoir 30 has a top pan 48 with a central depending sleeve 50 protruding to the lower interior part of the reservoir. A 20 amp limited heating element 52 is disposed close to the bottom of the reservoir interior. The exterior wall of the reservoir 30 is provided with a lower level metallic sensor probe 56 and an upper level metallic sensor probe 58. Accordingly, water entry in the reservoir via inlet 32 is led through pan 48 and sleeve 50 to the heating element 52. Sensor probes 56 and 58 sense the static level of the water in the reservoir 30. The sensor probes 56, 58, the heating element 52 and the solenoid operating valve 33 are electrically connected to the circuit board 44. The solenoid operating valve 38 in the first outlet 34 is controlled by operating switch 24, via the electronic circuit board 44. The reservoir 30 also contains a temperature sensing element in the form of a thermistor 60 electrically connected to the circuit board 44.

Figure 3:
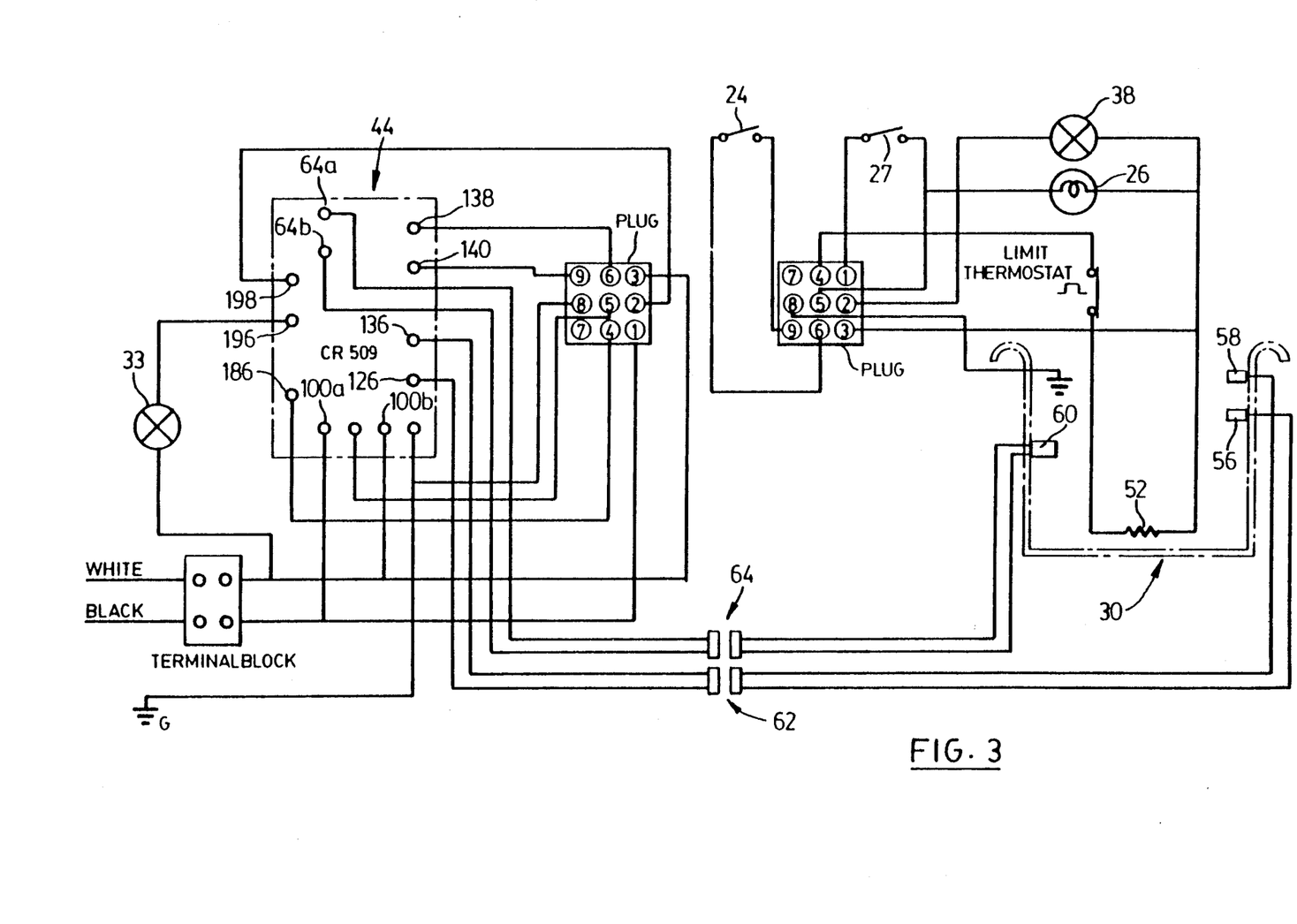
FIG. 3 is a wiring diagram of the machine of FIG. 1.

FIG. 3 is a wiring diagram for the illustrated embodiment of the invention. The circuit board 44 thereon is designated CR-509. The connections from the reservoir sensor probes and thermistor, to the circuit board are via plugs 62 and 64 respectively, to allow ready removability and replacement of the circuit board as required. Appropriate grounding and electrical power supplies are provided and connected as required.

Figure 4:
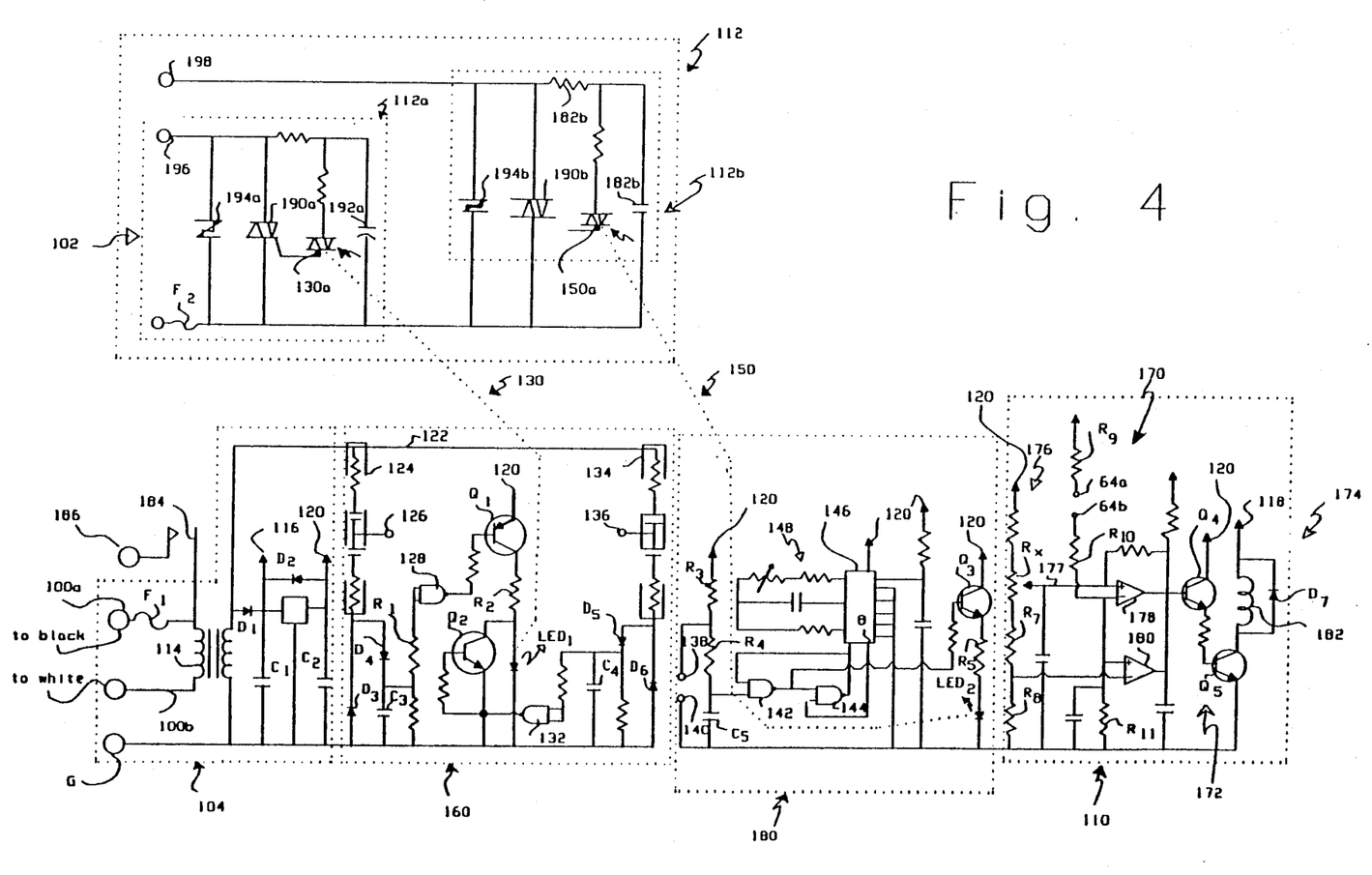
FIG. 4 is a circuit diagram of the electronic control board of the machine.

The preferred electronic solid state circuit board 44 (also designated CR-509 on FIG. 3) is better illustrated in FIG. 4 and comprises the following key elements:

dual fused power inputs 100a, 100b and 102; isolated and regulated power supply 104; dual water sensing circuitry 106; single shot time delay 108;

solid state thermistor temperature controller with relay output 110; and, dual isolated solid state solenoid drivers 112a and 112b.

The power inputs 100a and 100b are connected across the hot (black) and the neutral (white) input power lines via a replaceable fuse $F_1$. The power inputs 102 consist of a 1 amp limited solenoid/control circuit group with a board-mounted, replaceable fuse $F_2$. The power supply 104 includes a 120/12 volt step down transformer 114, a full-wave rectifier comprising diodes $D_1$ and $D_2$, filter capacitors $C_1$ and $C_2$ and a 3 terminal $5^v$ voltage regulator 116. A $12^v$ supply line 118 and a $5^v$ supply line 120 are connected to the power supply and to the various components in the board 44.

The water sensing circuitry 106 is connected across the terminals of the transformer 114 and receives a 12 volt AC isolated voltage from a supply conductor 122. The circuitry 106 includes a lower level sense circuit and an upper level sense circuit.

The lower level sense circuit includes a series resistive and capacitive circuit 124 connected between the supply conductor 122 and a ground G via a rectifier circuit. The rectifier circuit comprises diodes $D_3$ and $D_4$ and a capacitor $C_3$. An output pin 126 extends from the circuit 124 and is connected to one terminal of plug 62 to condition the metallic sensor probe 56 at a pre-set potential. A Nand gate 12B having its input pins interconnected receives the output voltage from the rectifier circuit via a resistor $R_1$. The output pin of the Nand gate 128 is connected to the base of a transistor $Q_1$. The collector of the transistor $Q_1$ receives the $5^v$ supply line 120 while the emitter of the transistor is connected to the ground G via a resistor $R_2$ and the light emitting diode ($LED_1$) of an opto-coupler/isolator 130. A second transistor $Q_2$ is connected between the emitter of transistor $Q_1$ and the ground G in parallel with the $LED_1$ and has its base connected to the output pin of another Nand gate 132.

The upper level sense circuit similarly includes a series resistive and capacitive circuit 134 connected between the supply conductor 122 and the ground G via a rectifier circuit. The rectifier circuit comprises diodes $D_5$ and $D_6$ and capacitor $C_4$. The input pins of the Nand gate 132 are interconnected and receive the output voltage of the rectifier circuit. An output pin 136 extends from the circuit 134 and is connected to the other terminal of the plug 62 to condition the upper metallic sensor probe 58 to the pre-set potential.

The timing circuit 108 controls the operation of the solenoid valve 38, for delivery of a quantity of hot water appropriate for a full pot of coffee. This timing circuit operates only with the brew switch 24 and outlet 34 for water to make coffee, and does not affect the operation of the inlet 32 and associated solenoid valve 33, which are solely under control of the level sensor probes 56, 58 via the sensing circuitry 106.

The timing circuit 108 is in communication with the brew switch 24 which is operable between on and off positions. The switch 24 is connected to the circuit 108 via a pair of terminals 138 and 140. The terminal 138 is connected to the supply line 120 via resistor $R_3$ while the terminal 140 is connected to the ground G. A circuit comprising resistor $R_4$ and capacitor $C_5$ is connected between resistor $R_3$ and the ground G in parallel with the terminals 138 and 140 and provides an open circuit condition. A flip-flop arrangement comprising a pair of interconnected Nand gates 142 and 144 has one of its inputs connected between the resistor $R_4$ and the capacitor $C_5$. The output of the flip-flop arrangement is connected to a counter 146 having a plurality of pins. The counter 146 provides a logic low output signal on pin 8 for a pre-determined amount of time when a negative transition is detected at the output of the Nand gate 144. The pre-determined amount of time is determined by the values of the resistive and capacitive components forming the time set circuitry 148.

A transistor $Q_3$ has its base connected to the flip flop arrangement and its collector connected to the supply line 120. The emitter of the transistor $Q_3$ is coupled to the ground G via a resistor $R_5$ and the light emitting diode ($LED_2$) of a second opto-coupler/isolator 150. Referring to the flip-flop arrangement, the Nand gate 142 has one of its input pins connected between the resistor $R_4$ and the capacitor $C_5$ and the other of its input pins connected to the output pin of Nand gate 144. The output pin of Nand gate 142 is supplied to one of the input pins of Nand gate 144 as well as to the base of transistor $Q_3$. The other input pin of Nand gate 144 receives the output signal from pin 8 of the counter 146.

The temperature controller 110 includes temperature detection circuitry 170, a relay driver 172 and a heater relay circuit 174. The detection circuitry 170 includes a voltage divider 176 comprising three fixed valve resistors $R_6$, $R_7$, $R_8$ and a variable resistor or trimpot $R_x$ connected between the supply line 120 and the ground G. An output lead 177 extends from the voltage divider 176 at the trimpot $R_x$ and is connected to the non-inverting terminal of an operational amplifier (op-amp) 178. The inverting terminal of the op-amp 178 is connected to the supply line 120 via a pair of resistors $R_9$ and $R_{10}$ and the external thermistor 60 through plug 64 and terminals 64a and 64b. The inverting terminal of op-amp 178 is also connected to the ground G via resistor $R_{11}$. A second op-amp 180 has its inverting terminal connected to the voltage divider 176 and its non-inverting terminal connected to the inverting terminal of op-am 178.

The output lines of the op-amps 178 and 180 are applied to the relay driver 172 which comprises a pair of interconnected transistors $Q_4$ and $Q_5$. The base of transistor $Q_4$ receives the output of the op-amps and has its collector connected to the supply line 120. The emitter of transistor $Q_4$ is connected to the base of transistor $Q_5$. Transistor $Q_5$ has its emitter connected to the ground G and its collector coupled to the heater relay circuit 174. The heater relay 174 comprises a coil 182 magnetically coupled to a switch 184 and a diode $D_7$ and receives the supply line 118. The switch 184 is operable to connect the terminal to the $120^v$ supply lines to energize the heating element 52 when the coil 182 is energized.

The solenoid drivers 112a and 112b are optically isolated from the low voltage circuitry 104, 106, 108, 110 and fuse protected. Each driver includes a 4 amp rated triac 190, a transient snubber RC network 192 and a movistor 194. The triac 190a of driver 112a has its firing pin connected to the triac 130a of the opto-coupler/isolator 130. The triac 190b of driver 112b has its firing pin connected to the triac 150a of opto-coupler-/isolator 150. The driver 112a provides supply current to the solenoid operating valve 33 via terminals 196 and 102a when the opto-coupler/isolator 130 is energized. Similarly, the driver 112b provides supply current to the solenoid operating valve 38 via terminals 198 and 102a when the opt-coupler/isolator 150 is energized.

The operation of the coffee making machine illustrated will be apparent from the figures of drawings and the foregoing description. When the fluid level in the reservoir is below the level of sensor probe 56, current flows from supply conductor 122 to the ground via circuits 124 and 134. This current flow provides a logic high voltage at the input pins of Nand gate 128 requiting in a logic low output therefrom. The logic low output of the Nand gate 128 is applied to the base of transistor $Q_1$ causing it to conduct. With transistor $Q_1$ conducting, current flows from the supply line 120 to the ground G via $LED_1$. The current does not pass through transistor $Q_2$ since this transistor does not operate in this condition. This is due to the fact that Nand gate 132 receives a logic high and on both of its input pins from the rectifier circuit connected to circuit 134 resulting in a logic output therefrom. The logic low output of the Nand gate 132 which is supplied to the base of the transistor $Q_2$, is insufficient to cause it to conduct.

When the $LED_1$ is supplied with drive current, it emits photons which are received by the associated triac 130a of the opto-coupler/isolator 130. The triac 130a in turn conducts, causing the triac 190a to be supplied with a logic high on its firing pin. This in turn allows the triac 190a to conduct and hence, allows current to pass through the solenoid valve 33. The reservoir 30 in turn is filled with water by the opening of the valve 33 in the inlet 32.

When the fluid level reaches the sensor probe 56, the circuit 124 is shorted due to the coupling of the supply conductor 122 to the housing of the coffee maker via the output lead 126, plug 62, probe 56 and the fluid. This removes the logic high supplied to the input pins of the Nand gate 128 since the rectifier circuit connected thereto is shorted. The output of the Nand gate 128 in this condition goes high causing the transistor $Q_1$ to turn off. With transistor $Q_1$ off, the $LED_1$ does not operate since it is removed from the supply line 120 thereby turning off triac 130a and hence, triac 190a. With triac 190a off, the solenoid valve 33 is de-energized causing the water inlet valve 33 to close.

If the lower level sensor circuit fails and the solenoid valve 33 remains energized after the fluid level has reached the level sensor probe 56, the upper level sensing circuit provides a back up. When the fluid level reaches the upper sensor probe 58, the circuit 134 is shorted due to the coupling of the supply conductor 122 to the housing via output lead 136, plug 62, probe 58 and the fluid. This removes the logic high supplied to the input pins of the Nand gate 132 since the rectifier circuit connected thereto is shorted. The Nand gate 132 in turn supplies a logic high to the base of transistor $Q_2$ causing it to conduct. With transistor $Q_2$ conducting, the drive current being supplied to the $LED_1$ of opto-coupler/isolator 130 is shorted through transistor $Q_2$ causing the opto-coupler/isolator 130 to turn-off. This in turn de-energizes the solenoid valve 33 and causes the inlet valve 33 to close. If the front panel 22 is provided with a lower level sensor failure indicator 26b, the indicator illuminates when the upper level sense circuit operates to close the solenoid valve 33.

Any time water is withdrawn from reservoir 30, by first outlet 34, second outset 40 (for other purposes than making coffee) or by simple evaporation, the dropping level is sensed by sensor probe 56, and the inlet 32 is opened to admit an appropriate quantity of water to restore the level in the manner described above. The refilling starts as soon as the level drops below sensor 56, and is not delayed whilst substantial quantities of water are drained off. Accordingly, the temperature of the water adjacent the outlets is maintained very close to the maximum set by the thermistor 60. Should sensor probe 56 fail, so that the water level rises beyond it, sensor probe 58 will operate similarly via circuit board 44 to shut valve 33 before overflow occurs.

The water as it enters the reservoir is heated by element 52, and is maintained at an appropriate temperature by means of thermistor 60 operating through circuit control board 44. In particular, when the temperature of the water is above a pre-determined level, the voltage supplied to the inverting terminal of op-amp 178 is less than or equal to the voltage supplied to the non-inverting terminal of op amp 178 via lead 177 and the voltage divider 176. In this case, the output of the op-amp 178 is below the drive threshold for transistor $Q_4$ preventing its operation. When transistor $Q_4$ is off, transistor $Q_5$ remains off to prevent current from energizing the heater relay circuit 174. In this condition, the output of op-amp 180 also remains below the drive threshold voltage of transistor $Q_4$ since the voltage at the non-inverting terminal of the op-amp 180 remains above the voltage at its inverting terminal.

However, when the water temperature drops below a pre-determined value (as set by the resistance of trimpot $R_x$), the op-amp 178 generates a positive output voltage. The positive voltage is supplied to the base of transistor $Q_4$ causing it to turn on. With transistor $Q_4$ on, the base of transistor $Q_5$ becomes connected to the supply line 120 causing the transistor $Q_5$ to conduct. When this occurs, current flows from supply line 118, through the coil 182 to the ground. With the coil 182 energized, the switch 184 moves to the closed position to connect the heating element 52 to the $120^v$ A.C. supply. The circuit remains in this condition until the fluid temperature in the reservoir 30 rises above the pre-determined temperature. When this occurs, the output voltage of the op-amp 178 falls below the drive threshold of transistor $Q_4$ This of course, turns transistor $Q_5$ off and isolates the heater relay circuit 174 from supply current.

The output of the op-amp 180 has no effect on the operation of the circuit 170 unless the thermistor 60 shorts. In this case, the negative output voltage of the op-amp 180 becomes significantly large to counter the positive output voltage of the op-amp 178. This prevents the transistor $Q_4$ from being supplied with a base voltage above its threshold thereby inhibiting operation of the heater relay circuit 174. The nature of the control board allows the thermistor to be set to 210° F. without fear of boiling over, and ensures that the water is kept at a temperature within about 3° F. of the pre-set level. If the front panel 22 is provided with a temperature indicator, the indicator 26a illuminates when the output of the op-amp 178 is insufficient to bias transistor $Q_4$ into operation.

The operator, requiring to initiate a brew cycle and prepare a pot of coffee, manually operates switch 24, which operates the timer circuit of control board 44 to open outlet valve 38 for delivery of an appropriate quantity of very hot water to contact the ground coffee contained in the filter basket 20.

In particular, when the brew switch 24 is momentarily moved to the on position, the signal supplied to the input pin of the Nand gate 142 connected between resistor $R_4$ and capacitor $C_5$, drops from a high condition to a low condition for a short duration before it reverts back to a logic high condition. This causes the output of the Nand gate 142 to go high. The logic high output of the Nand gate 142 is conveyed to the base of transistor $Q_3$ causing it to turn on. With transistor $Q_3$ on, current flows through the $LED_2$ of optocoupler/isolator 150. This in turn energizes the brew solenoid valve 38 causing the solenoid valve 38 to open since triac 190b is operated, and permits water to be sprayed into the filter basket 20.

Simultaneously, the Nand gate 144 also receives the logic high output of the Nand gate 142 which causes the Nand gate 144 to output a logic low. The logic low output of Nand gate 144 is supplied to the input of Nand gate 142 which has no effect on the output thereof, since the inputs to the Nand gate 142 are high and low respectively. The negative transition from the logic high to the logic low at the output pin of Nand gate 144 is also detected by the counter 146. The detection of this transition causes the counter 146 to commence its count as determined by the circuit 148.

When the counter 146 reaches its pre-determined count, the count being chosen to permit a sufficient amount of water to be sprayed into the filter basket to result in a full pot of coffee, the output signal supplied to pin 8 goes low which causes the output of Nand gate 144 to go high. When this occurs, the input pins to Nand gate 142 both become high causing Nand gate 142 to generate a logic low output. With the output of Nand gate 142 low, transistor $Q_3$ is turned off, thereby isolating $LED_2$ from the supply line 120. This in turn shuts off the opto-coupler/isolator 150 and hence, triac 190b. The solenoid valve 38 is deenergized causing outlet valve 38 to close thereby inhibiting any more water from entering the filter basket 20.

With the output of Nand gate 142 low, the other Nand gate 144 receives two logic lows on its input pins causing it to maintain the logic high output. The counter 158 reverts the output signal on pin 8 back to the logic high state after a pre-set delay to ensure that the output of Nand gate 142 is low. This has no effect on the output of the Nand gate 144 and places the timing circuit 108 into the pre-operation stage. When the brew switch 24 is depressed again, the same process is repeated.

Accordingly, this apparatus provides a full pot of coffee at every operation, no matter how water has previously been extracted from the reservoir and no matter what the pressure of water supplied thereto. The temperature of the water in the reservoir is thermostatically controlled with a relatively fine tolerance, and can be delivered through the outlet to contact the coffee at temperatures not less than 200° F.

It will be appreciated that the form of apparatus according to the invention as shown in the drawings and described in detail is illustrative only, and many variations thereon can be made without departing the spirit and scope of this invention. Its scope is defined and limited only by the appended claims.

We claim:

1. A coffee making machine of the type adapted to be connected to a mains water supply and to deliver hot water during a brewing cycle to ground coffee supported in a removable filter element, said coffee making machine comprising:

a reservoir for water heating and storage;

valved inlet means adapted to connect the reservoir to mains water supply;

outlet means operable to deliver hot water from the reservoir to contact ground coffee;

an electrical heating element operable to heat the contents of the reservoir;

lower level sensing means adapted to sense a pre-determined water level condition in the reservoir;

upper level sensing means disposed above the lower level sensing means and adapted to sense an overfill water level condition in the reservoir;

temperature sensing means for monitoring the temperature of the reservoir contents; and control means in communication with said temperature sensing means and operable to enable the heating element in response to signals received from the temperature sensing means to maintain the reservoir contents within a pre-determined temperature range and also adapted to open the valved inlet means for water supply to the reservoir in response to signals received from said lower level sensing means when said water is below said pre-determined water levl condition, said control means further being responsive to signals received from said upper level sensing means to close said valved inlet means in the event of a malfunction of said lower level sensing means and upon detection of said overfill water level condition.

2. The coffee machine as defined in claim 1 wherein said reservoir contents is maintained at a temperature between 205° F. and 210° F.

3. The coffee making machine as defined in claim 2 wherein said temperature sensing means includes a thermistor positioned in said reservoir and forming a circuit element of a voltage divider, said control means including a comparator for comparing the potential at a point along the divider with a reference voltage and enabling said heating element when the potential at said point falls below said reference voltage by a preset value.

4. The coffee making machine as defined in claim 1 wherein said upper and lower level sensing means are in the form of metallic probes extending into said reservoir, said probes being conditioned at a pre-set potential and forming a short circuit upon contact with the reservoir contents, said control means detecting said short circuit condition and operating said valved inlet means to a closed position.

5. The coffee making machine as defined in claim 1 wherein said control means further includes a brew cycle operating means adapted to cause delivery of hot water through said outlet means for a pre-determined period of time.

6. The coffee making machine as defined in claim 5 wherein said control means opens the outlet means in response to operation of the brew cycle operating means, and also serves to cause refilling of the reservoir with cold water from the mains water supply to the pre-determined water level condition in response to signals received from the lower level sensing means.

7. The coffee making machine as defined in claims 1, 5 or 3 wherein said control means is in the form of a solid state electronic circuit control board, said circuit control board being manually removable from said machine and replaceable therein as a modular unit.

8. The coffee making machine as defined in claim 1 further comprising visual indication means operable to provide a visual indication upon detection of said overfill water level condition by said upper level sensing means.

9. A brewing head adapted for use in conjunction with a coffee making machine, the brewing head including:
　a reservoir for water heating and storage;
　valved inlet means adapted to connect the reservoir to mains water supply;
　outlet means operable to deliver hot water from the reservoir to contact ground coffee;
　an electrical heating element operable to heat the contents of the reservoir;
　lower level sensing means adapted to sense a pre-determined water level condition in the reservoir;
　upper level sensing means disposed above the lower level sensing means and adapted to sense an overfill water level condition in the reservoir;
　temperature sensing means for monitoring the temperature of the reservoir contents; and
　a solid state controller in communication with said temperature sensing means and operable to enable said heating element in response to signals received from the temperature sensing means to maintain the reservoir contents within a pre-determined temperature range and also adapted to open the valved inlet means for water supply to the reservoir in response to signals received from said lower level sensing means when said water is below said pre-determined water level condition, said control means further being responsive to signals received from said upper level sensing means to close said valved inlet means in the event of a malfunction of said lower level sensing means and upon detection of said overfill water level condition.

10. A coffee making machine of the type adapted to be connected to a mains water supply and to deliver hot water during a brewing cycle to ground coffee supported in a removable filter element, said coffee making machine comprising:
　a reservoir for water heating and storage;
　valved inlet means adapted to connect the reservoir to mains water supply;
　outlet means operable to deliver hot water from the reservoir to contact ground coffee;
　an electrical heating element operable to heat the contents of the reservoir;
　lower level sensing means adapted to sense a pre-determined water level condition in the reservoir;
　temperature sensing means including a thermistor positioned in said reservoir and forming a circuit element of a voltage divider, said temperature sensing means for monitoring the temperature of the reservoir contents; and
　control means in communication with said temperature sensing means, said control means including a comparator for comparing the potential at a point along said voltage divider with a reference voltage and enabling said heating element when the potential at said point falls below said reference voltage by a pre-set level to maintain the reservoir contents within a pre-determined temperature range, said control means also being adapted to open the valved inlet means for water supply to the reservoir in response to signals received from the lower level sensing means when the water is below the pre-determined water level condition.

11. The coffee making machine as defined in claim 10 wherein said reservoir contents is maintained at a temperature between 205° F. and 210° F.

12. The coffee making machine as defined in claim 10 wherein the reservoir is further equipped with an upper level sensing means disposed above the lower level sensing means and adapted to sense an overfill water level condition in the reservoir, the control means being responsive to signals received from the upper level sensing means to close the valved inlet means in the event of a malfunction of said lower level sensing means and upon detection of said overfill water level condition.

13. The coffee making machine as defined in claim 12 wherein said upper and lower level sensing means are in the form of metallic probes extending into said reservoir, said probes being conditioned at a pre-set potential and forming a short circuit upon contact with the reservoir contents, said control means detecting said short circuit condition and operating said valved inlet means to a closed position.

14. The coffee making machine as defined in claim 12 further comprising visual indication means operable to provide a visual indication upon detection of said overfill water level condition by said upper level sensing means.

* * * * *